United States Patent
Zhou et al.

(10) Patent No.: US 7,933,371 B2
(45) Date of Patent: Apr. 26, 2011

(54) CHANNEL ENVIRONMENT-ADAPTED MMSE RECEPTION METHOD AND APPARATUS USING MULTIPLE RECEIVE ANTENNAS

(75) Inventors: Huigiang Zhou, Suwon-si (KR); Jong-Hun Rhee, Suwon-si (KR); Min-Goo Kim, Yongin-si (KR); Sung-Soo Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 739 days.

(21) Appl. No.: 11/945,636

(22) Filed: Nov. 27, 2007

(65) Prior Publication Data

US 2008/0144752 A1    Jun. 19, 2008

(30) Foreign Application Priority Data

Nov. 27, 2006    (KR) .................. 10-2006-0117906

(51) Int. Cl.
*H04B 7/10* (2006.01)
(52) U.S. Cl. ..................................................... 375/347
(58) Field of Classification Search .................. 375/347, 375/349, 267, 260
See application file for complete search history.

(56) References Cited

U.S. PATENT DOCUMENTS

2006/0012520 A1*    1/2006    Tsai et al. .................... 342/377

* cited by examiner

*Primary Examiner* — Kevin Y Kim
(74) *Attorney, Agent, or Firm* — The Farrell Law Firm, P.C.

(57) ABSTRACT

Method and Apparatus for controlling combining coefficients of multiple receive antennas according to the channel conditions in a mobile communication system, to improve data restoration performance. A mobile station detects preamble, pilot and data from a signal received from a base station via the multiple receive antennas, measures a channel correlation from the detected preamble, classifies time-domain/frequency-domain intervals having a channel correlation exceeding a predetermined threshold as calculation regions, and calculates MMSE coefficients for the calculation regions. In this way, the mobile station finds the optimal coefficients for combining the signal received via the multiple receive antennas, thereby optimizing the reception performance.

16 Claims, 11 Drawing Sheets

|  | TIME-DOMAIN CHANNEL CORRELATION > 0.6 | TIME-DOMAIN CHANNEL CORRELATION ≤ 0.6 |
|---|---|---|
| FREQUENCY-DOMAIN CHANNEL CORRELATION > 0.9 (42 SUBCARRIERS) | 8 OFDM SYMBOLS x 42 SUBCARRIERS | 4 OFDM SYMBOLS x 42 SUBCARRIERS |
| FREQUENCY-DOMAIN CHANNEL CORRELATION ≤ 0.9 (42 SUBCARRIERS) | 8 OFDM SYMBOLS x 21 SUBCARRIERS | 4 OFDM SYMBOLS x 21 SUBCARRIERS |

CHANNEL ENVIRONMENT-ADAPTED MMSE RECEPTION METHOD AND APPARATUS USING MULTIPLE RECEIVE ANTENNAS

PRIORITY

This application claims priority under 35 U.S.C. §119(a) to a Korean Patent Application filed in the Korean Intellectual Property Office on Nov. 27, 2006 and assigned Serial No. 2006-117906, the disclosure of which is incorporated herein by reference.

BACKGROUND OF THE INVENTION

1. Field of the Invention

The present invention relates generally to a mobile communication system, and in particular, to a reception apparatus and method for improving data restoration performance by efficiently canceling interference input to multiple receive antennas according to channel conditions.

2. Description of the Related Art

Extensive research into the next generation mobile communication system is being conducted to provide users with services having various Quality-of Service (QoS) classes at a high rate of about 100 Mbps. The typical next generation mobile communication system include an Institute of Electrical and Electronics Engineers (IEEE) 802.16e system, a $3^{rd}$ Generation Partnership Project (3GPP)/3GPP2 Long Term Evolution (LTE) system, etc.

The IEEE 802.16e system and the LTE system aim at high-quality, high-capacity multimedia data transmission within a limited frequency. For this, a method for sending a large volume of data using the limited frequency can use a Multiple Input Multiple Output (MIMO) scheme and an Orthogonal Frequency Division Multiplexing (OFDM)/Orthogonal Frequency Division Multiple Access (OFDMA) scheme together.

The MIMO scheme, as it uses multiple antennas for data transmission/reception, forms multiple independent fading channels and transmits different signals via each transmit antenna, thereby noticeably improving the data rate. The MIMO scheme can send a large volume of data without increasing the number of frequency channels. The OFDM scheme, a scheme for parallel-processing high-speed data and parallel-transmitting the data using multiple subcarriers, converts the high-speed data into low-speed data and simultaneously transmits it over multiple carriers.

FIG. 1 illustrates a configuration of a general mobile communication system.

Referring to FIG. 1, a mobile communication system includes a mobile station 102, a serving base station 104, and neighbor base stations 106 and 108. The transmission signals from the neighbor base stations 106 and 108, except for the signal transmitted from the serving base station 104, serve as interference signals to the mobile station 102. The interference signals cause correlation errors between signals received via antennas of a multi-antenna receiver.

When a mobile station capable of accessing the mobile communication system has multiple receive antennas, the mobile station constructs the optimal signal format by commonly combining signals between the receive antennas by means of a Maximal Ratio Combining (MRC) reception method. The MRC reception method is a method capable of obtaining the optimal performance when the noise and interference components of the signals received at the antennas are independent of each other.

Because the conventional method estimates only the channel conditions of the antennas individually in combining signals received at the antennas, the conventional method may lose information on the correlation between the antennas, causing a reduction in the reception performance. In addition, because the individual channel estimation causes a channel estimation error due to the interference signals, the conventional MRC combining method brings with it a reduction in the system performance.

In a system employing the OFDM scheme (an OFDM system), the signals received at the multiple receive antennas suffer from a reduction in orthogonality and have a correlation with each other due to signal distortion and frequency phase error of the channels. Therefore, it is not preferable to apply the conventional MRC reception method to the signals having the correlation-rich interference components.

SUMMARY OF THE INVENTION

An aspect of the present invention is to address at least the problems and/or disadvantages described above and to provide at least the advantages described below. Accordingly, an aspect of the present invention is to provide a reception apparatus and method for efficiently canceling interference signals received at multiple receive antennas according to channel conditions, thereby improving data restoration performance.

Another aspect of the present invention is to provide a reception apparatus and method including an algorithm for adaptively performing channel estimation using time/frequency-domain correlation characteristics of signals received at a mobile station from several base stations in a mobile communication system.

Another aspect of the present invention is to provide an apparatus and method for detecting transmission signals by means of a Minimum Mean-Squared Error (MMSE) scheme taking into account the time/frequency-domain correlation characteristics of channel conditions from the signals received via multiple receive antennas in a mobile communication system that estimates channel conditions.

According to one aspect of the present invention, there is provided a method for receiving a signal in an Orthogonal Frequency Division Multiplexing (OFDM) mobile communication system using multiple receive antennas. The signal reception method includes dividing a signal received via multiple receive antennas into multiple calculation regions each having a frequency-domain channel correlation and a time-domain channel correlation exceeding a predetermined threshold; separately calculating Minimum Mean-Squared Error (MMSE) coefficients for the calculation regions using pilot signals in the calculation regions; and restoring a transmission signal by performing MMSE detection on the received signal using the MMSE coefficients.

According to another aspect of the present invention, there is provided an apparatus for receiving a signal in an Orthogonal Frequency Division Multiplexing (OFDM) mobile communication system using multiple receive antennas. The signal reception apparatus includes a controller for dividing a signal received via multiple receive antennas into multiple calculation regions each having a frequency-domain channel correlation and a time-domain channel correlation exceeding a predetermined threshold, and separately calculating Minimum Mean-Squared Error (MMSE) coefficients for the calculation regions using pilot signals in the calculation regions;

and an MMSE detector for restoring a transmission signal by performing MMSE detection on the received signal using the MMSE coefficients.

BRIEF DESCRIPTION OF THE DRAWINGS

The above and other aspects, features and advantages of the present invention will become more apparent from the following detailed description when taken in conjunction with the accompanying drawings in which:

FIG. 10 illustrates an example of setting a size of an MMSE calculation region according to another embodiment of the present invention.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention effectively cancels interference in a mobile communication system employing multiple receive antennas. Although the following description will be made herein with reference to an IEEE 802.16e system, by way of example, the concept of the present invention can be applied to a mobile communication system employing OFDM/OFDMA and MIMO schemes (OFDM(A)-MIMO mobile communication system).

In the OFDM(A)-MIMO system where interference signal components received at a mobile station via multiple receive antennas have a correlation with each other, the use of a Minimum Mean-Squared Error (MMSE) reception method can effectively cancel the interference signal components. A receiver of the mobile station cancels the interference using the MMSE method.

The mobile station separates a control signal from the received signal, detects locations of pilot signals and data signals in the frame, estimates channel conditions of the received signal, and classifies the time/frequency regions where a correlation between the channel conditions (channel correlation) exceeds a predetermined threshold, as calculation regions depending on the estimated channel conditions. The channel correlation is calculated separately for the frequency domain and the time domain. The mobile station calculates an MMSE coefficient separately for each calculation region from the pilot signal included in each calculation region, and effectively cancels an interference component of the signal received via multiple receive antennas from the calculated MMSE coefficient.

Specifically, the present invention divides the received signal into multiple calculation regions where a channel correlation between time/frequency resources is relatively higher, and calculate an MMSE coefficient for each calculation region.

A description of embodiments of the present invention will now be made with reference to, for example, a Downlink (DL) operation between a base station and a mobile station in the IEEE 802.16e system.

Figure 1:
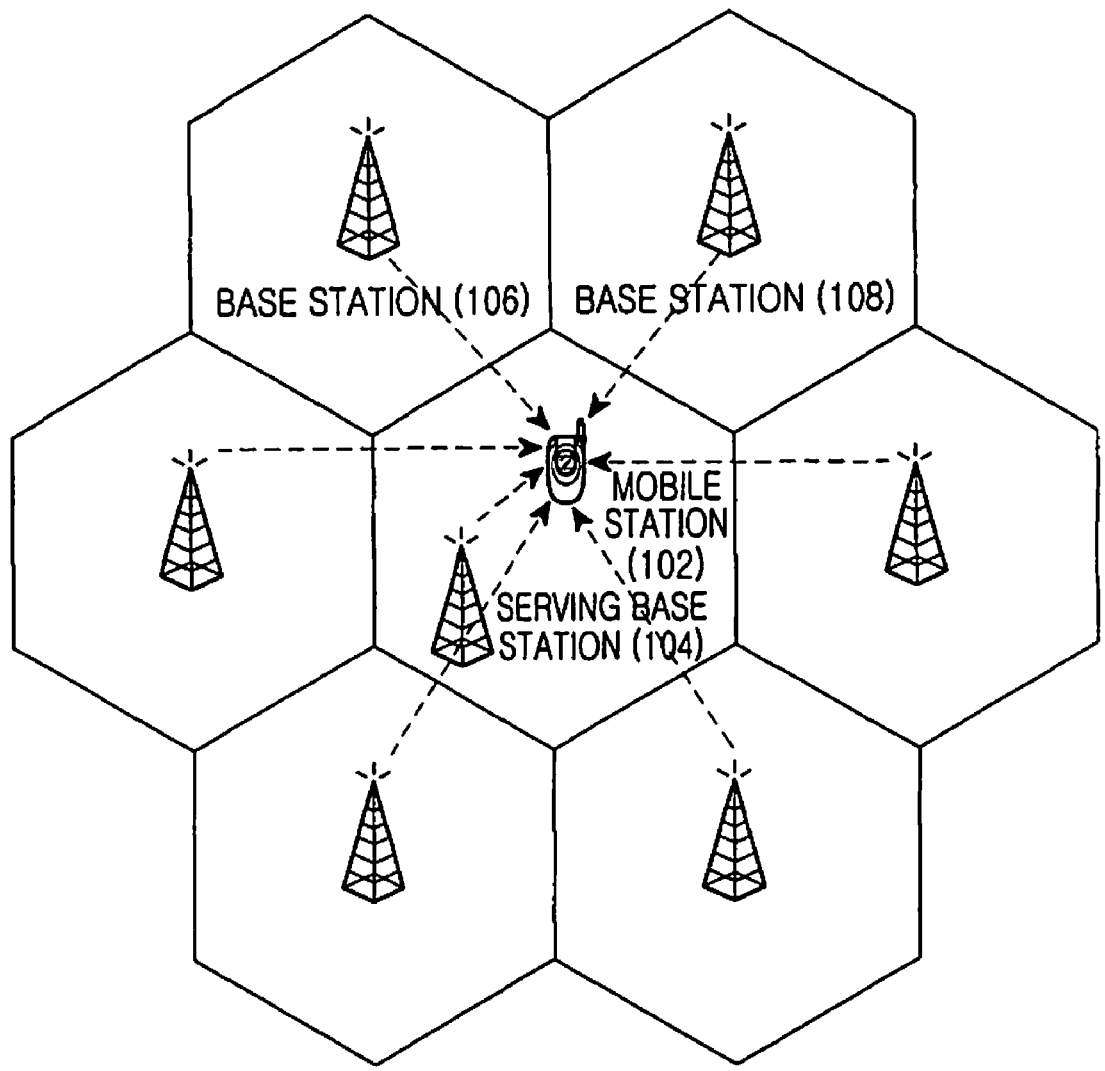
FIG. 1 illustrates a configuration of a general mobile communication system.
Figure 2:
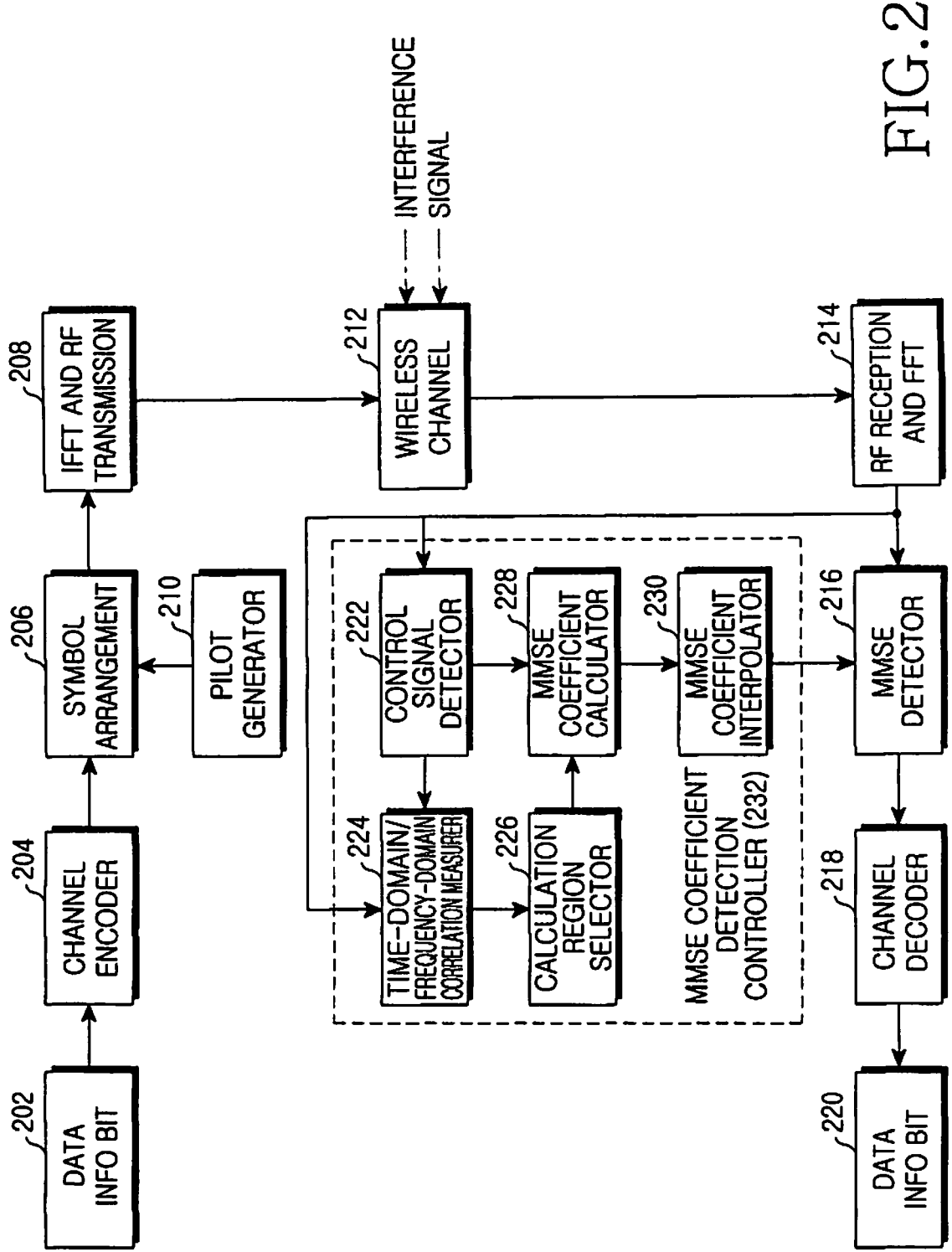
FIG. 2 illustrates a block diagram of a data transmitter and receiver in an OFDM/OFDMA mobile communication system according to a preferred embodiment of the present invention.

FIG. 2 illustrates a block diagram of a data transmitter and receiver in an OFDM(A) mobile communication system according to a preferred embodiment of the present invention. As illustrated, the transmitter includes a channel encoder 204, a symbol arrangement unit 206, an Inverse Fast Fourier Transform (IFFT) and Radio Frequency (RF) transmission unit 208, and a pilot generator 210, and the receiver includes an RF reception and FFT unit 214, an MMSE detector 216, a channel decoder 218, and an MMSE coefficient detection controller 232. The MMSE coefficient detection controller 232 includes a control signal detector 222, a time-domain/frequency-domain correlation measurer 224, a calculation region selector 226, an MMSE coefficient calculator 228, and an MMSE coefficient interpolator 230. It should be noted that only the major elements related to the transmitter/receiver are shown herein for simplicity.

Data information bits 202 are encoded by the channel encoder 204. The pilot generated by the pilot generator 210 and the channel-encoded data are converted into OFDM(A) symbols by means of the IFFT and RF transmission unit 208, and then transmitted over associated subchannels. The transmitted signal is delivered to the receiver along with an interference signal of a neighbor base station over a wireless channel 212.

The signal received at the RF reception and FFT unit 214 of the receiver is converted into an OFDM(A) signal, and the converted OFDM(A) signal is input to the MMSE detector 216 and the MMSE coefficient detection controller 232. The MMSE coefficient detection controller 232 detects MMSE coefficients for restoration of the received signal, and inputs the detected MMSE coefficients to the MMSE detector 216. Upon receipt of the MMSE coefficients, the MMSE detector 216 restores the transmission signal by effectively canceling the interference component through MMSE detection from the OFDM(A) signal received from the RF reception and FFT unit 214, and inputs the restored transmission signal to the channel decoder 218. The channel decoder 218 performs a channel decoding and error correction process on the restored transmission signal to detect data information bits 220.

A detailed description of an operation of the MMSE coefficient detection controller 232 will be made below.

The received signal output from the RF reception and FFT unit 214 is input to the control signal detector 222 and the time-domain/frequency-domain correlation measurer 224. The control signal detector 222 detects a preamble signal and a control signal in the received signal to acquire channel information, and finds locations of a data signal and a pilot signal in one frame (or one burst) depending on the control signal. For example, the control signal can be MAP (mapping) information used in the OFDM(A) system. The time-domain/frequency-domain correlation measurer 224 measures a channel correlation in the frequency domain and the time domain depending on the preamble signal detected from the received signal. The calculation region selector 226 classifies each of the frequency/time intervals where the measured channel correlation exceeds a predetermined threshold, as more than one region (MMSE calculation region).

Figure 3:
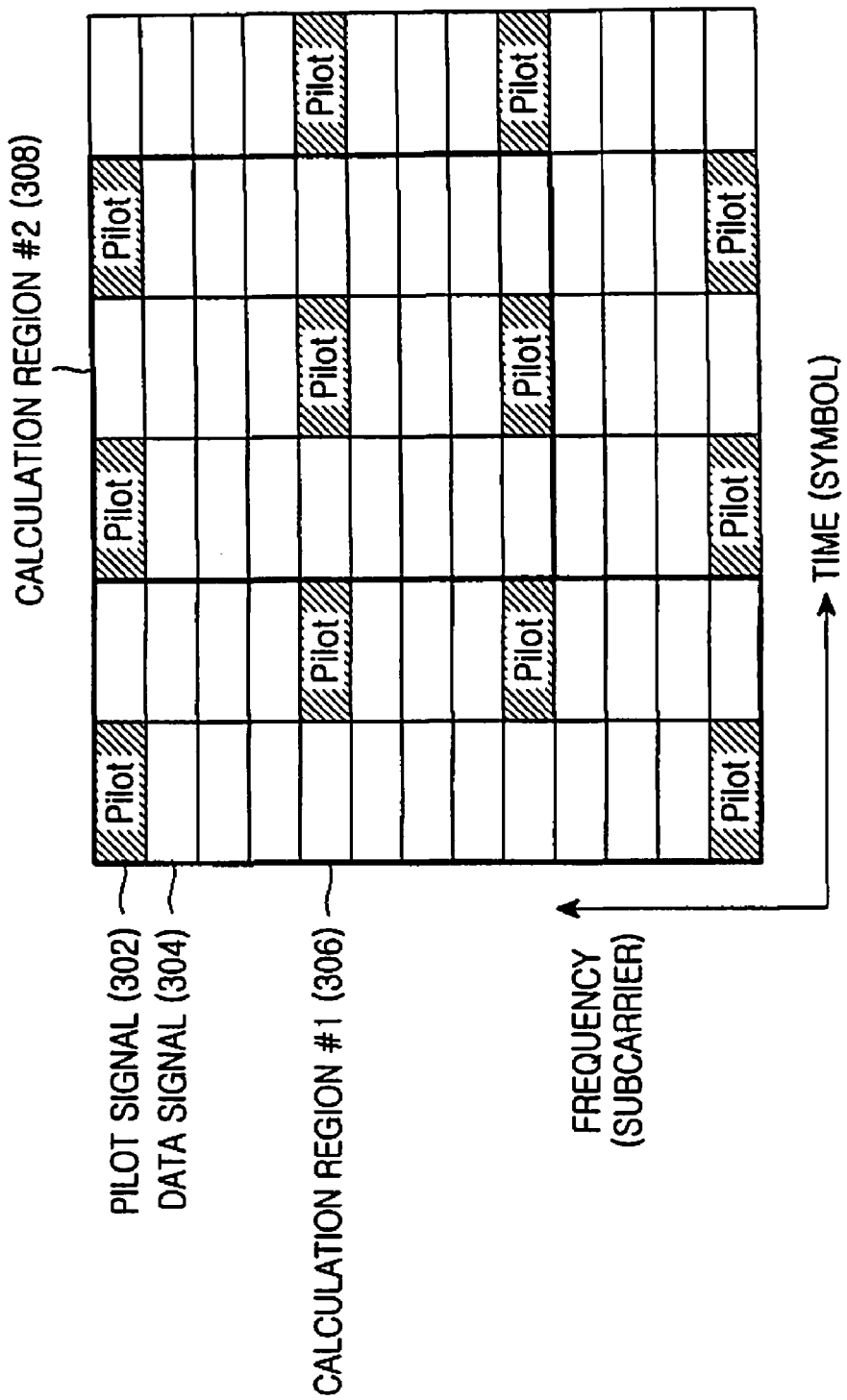
FIG. 3 illustrates an example of locations of data signals and pilot signals in a burst transmitted by an OFDM/OFDMA mobile communication system.

The MMSE coefficient calculator 228 calculates an MMSE coefficient for a corresponding calculation region using the channel conditions for the pilot signals in each calculation region. The calculation of the MMSE coefficient is performed in units of the MMSE calculation regions, each of which is composed of consecutive OFDM symbols and consecutive subcarriers as shown in FIG. 3. All channel condition values in each MMSE calculation region have a mutual correlation exceeding a threshold. The MMSE coefficients calculated in each calculation region are provided to the MMSE coefficient interpolator 230, and the MMSE coefficient interpolator 230 determines MMSE coefficients for data signals of the received signal by linear interpolation using the provided MMSE coefficients. The MMSE coefficients for the data signals are provided to the MMSE detector 216, and the MMSE detector 216, with use of the MMSE coefficients, cancels an interference signal component from the signal received via multiple receive antennas by MMSE detection, thereby restoring the transmission signal. The restored transmission signal is input to the channel decoder 218, and the channel decoder 218 detects the data information bits 220 by performing an error correction and decoding operation on the restored transmission signal.

Before a description of an MMSE reception method according to a preferred embodiment of the present invention is given, an example of an MMSE calculation region, which makes a unit of MMSE coefficient calculation, is shown in FIG. 3.

FIG. 3 illustrates an example of locations of data signals and pilot signals in a burst transmitted by an OFDM(A) mobile communication system. The illustrated structure shows locations of pilot and data signals in an UpLink (UL)/DownLink (DL) burst used in the IEEE 802.16e system. A different burst structure can be used by every base station.

Referring to FIG. 3, one OFDM(A) burst includes multiple OFDM(A) symbols separated in the time domain. Each of the OFDM symbols is transmitted over multiple subcarriers separated in the frequency domain, and the multiple subcarriers are grouped into subchannels each including a predetermined number of subcarriers. Each bin transmitted over one symbol and one subcarrier is classified as a pilot signal 302 or a data signal 304 according to its location.

The bin denoted by "Pilot" 302 indicates a pilot. The receiver can determine arrangement of pilots depending on the control signal detected by the control signal detector 222, and the pilots are used for channel estimation. The data region is an interval where the data signal 304 is transmitted. The bins constituting the OFDM frame are classified as multiple MMSE calculation regions 306 and 308 that can vary in size and type according to channel correlations in the time domain and the frequency domain, measured by the time-domain/frequency-domain correlation measurer 224.

The calculation of the MMSE coefficients is performed in units of MMSE calculation regions, each of which is composed of consecutive OFDM symbols and consecutive subcarriers. The size and type of each calculation region is adaptively selected according to the channel correlation in the time domain and the channel correlation in the frequency domain. A detailed algorithm for this will be described below. Data and pilot signals in one burst can be included in the calculation regions having various or same types.

Figure 4:
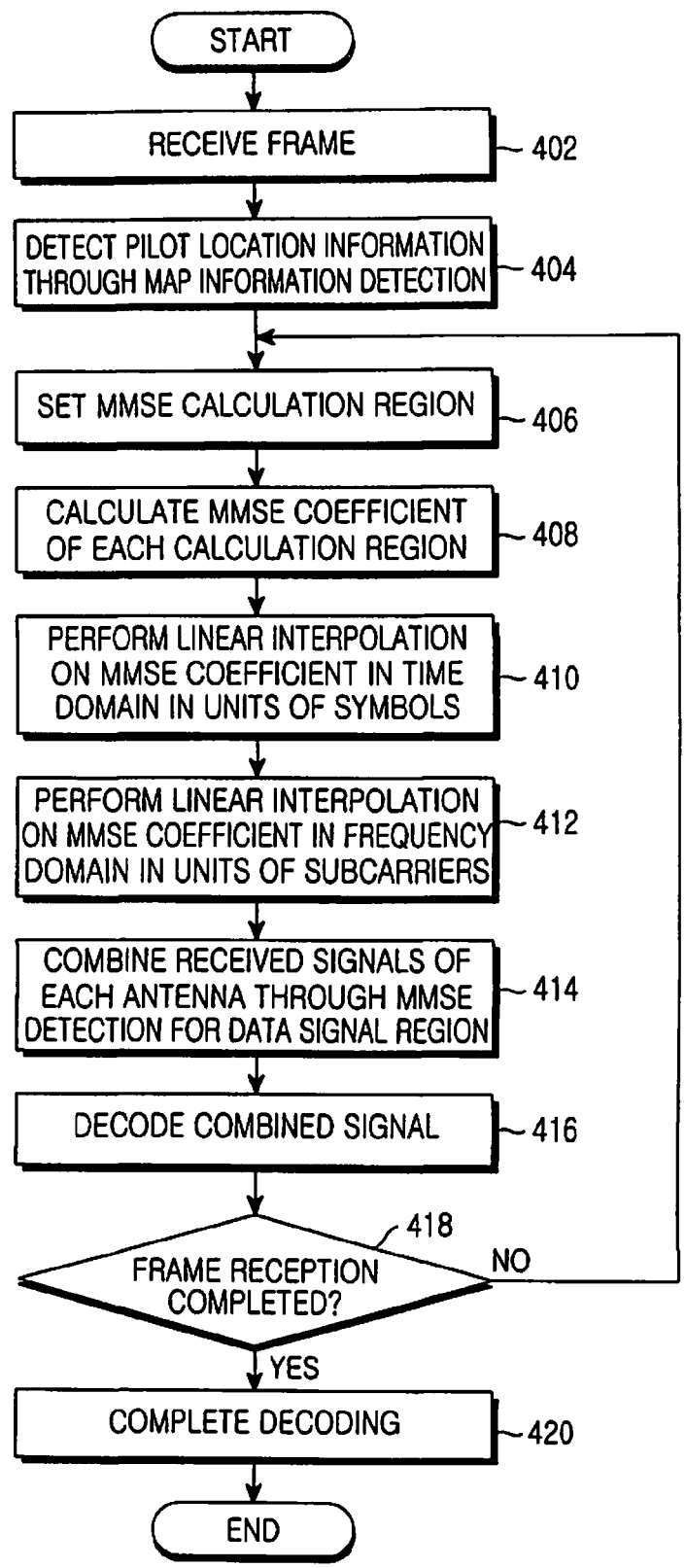
FIG. 4 illustrates the overall operation for MMSE reception according to a preferred embodiment of the present invention.

FIG. 4 illustrates the overall operation for MMSE reception according to a preferred embodiment of the present invention.

Referring to FIG. 4, after receiving a one-frame signal in step 402, a receiver of a mobile station determines in step 404 a structure of the frame by parsing a control signal included in the frame. Specifically, the receiver determines locations of data and pilot in the frame depending on MAP (mapping) information included in the frame. In step 406, the receiver sets MMSE calculation regions for the frame based on the preamble included in the frame.

The receiver measures correlations, or channel correlations, of channel condition values for the time domain and the frequency domain for the frame, and determines the bins where the channel correlations exceed a predetermined threshold, as one calculation region. If the mobile station moves fast, the time-domain channel correlation decreases as a whole. Therefore, a time-domain length of the MMSE calculation region decreases with an increase in velocity of the mobile station. In addition, because the frequency-domain channel correlation decreases with an increase in multiple paths, a frequency-domain length of the MMSE calculation region reduces with an increase in the multiple paths between the transmitter and the receiver.

After setting the MMSE calculation regions in step 406, the receiver calculates in step 408 an MMSE coefficient by the pilots included in each MMSE calculation region. Through this calculation, one MMSE coefficient is generated separately for each MMSE calculation region. The MMSE coefficients are used for channel compensation and transmission signal restoration in the MMSE detector 216 that combines the received signals from the receive antennas. In order to compensate the received signals with the MMSE coefficients determined by the pilots, the receiver interpolates the MMSE coefficients in the time domain and the frequency domain in steps 410 and 412.

Specifically, the receiver interpolates the MMSE coefficients calculated separately for the MMSE calculation regions in the time domain in step 410, and interpolates the time-domain interpolated MMSE coefficients in the frequency domain in step 412. The interpolation technique can be classified into various schemes, and a linear interpolation method is an example thereof. The MMSE coefficients for data signals of a data region are determined through interpolation in each domain.

In step 414, the MMSE coefficient for each data signal is used for combining corresponding data signals received from multiple receive antennas. The combined data signal is decoded by a channel decoder in step 416, and the receiver checks in step 418 whether decoding for the frame is completed. If decoding for all data signals in the frame is completed, the receiver ends the reception process in step 420. However, if the decoding is not completed, the receiver returns to step 406.

Figure 5:
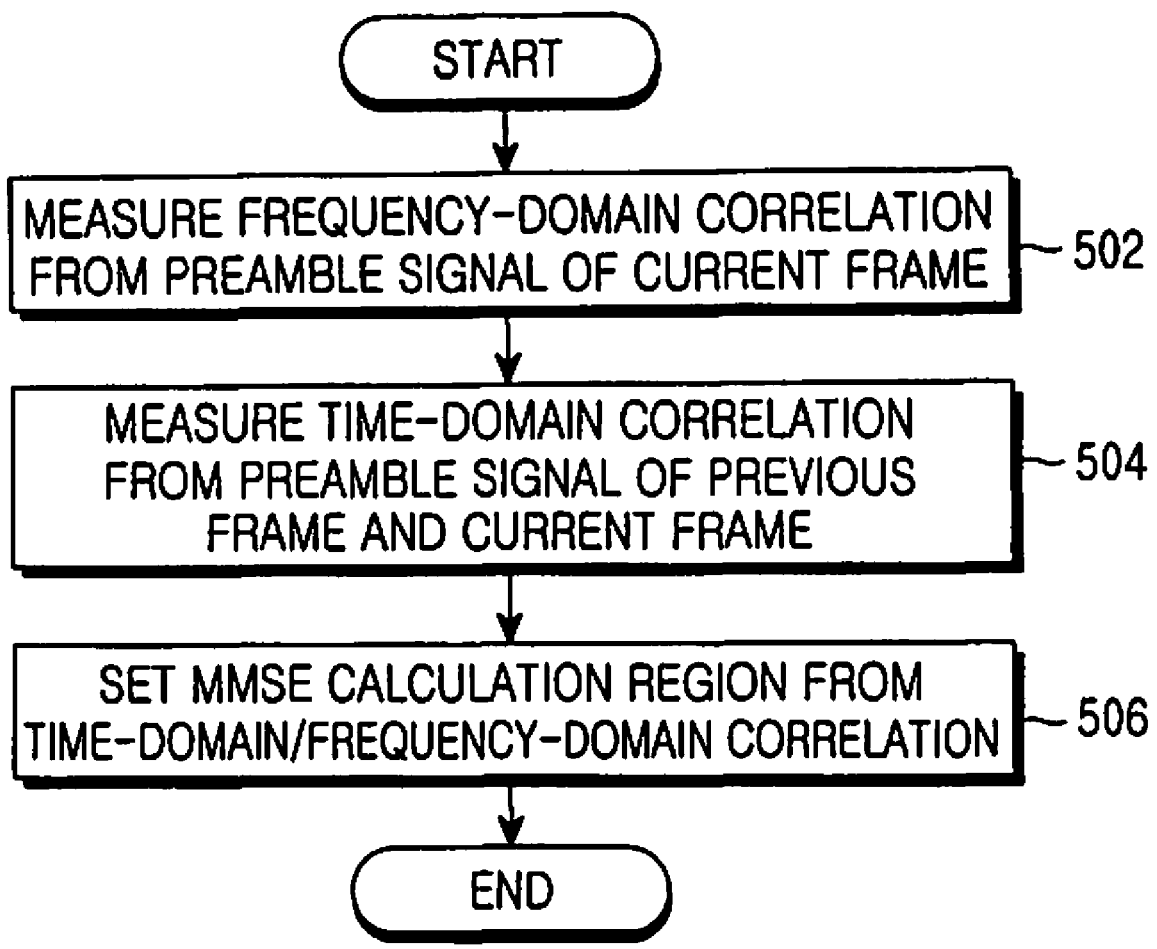
FIG. 5 illustrates an exemplary process of setting an MMSE calculation region according to an embodiment of the present invention.

FIG. 5 illustrates an exemplary process of setting an MMSE calculation region according to an embodiment of the present invention.

Referring to FIG. 5, the receiver measures a frequency-domain channel correlation of the frame from the channel condition obtained using the preamble detected from the currently received frame in step 502, and measures a time-domain channel correlation from the channel condition obtained using the preambles of the previous frame and the current frame in step 504. In step 506, the receiver sets an MMSE calculation region from the time-domain/frequency-domain channel correlations.

Figure 6:
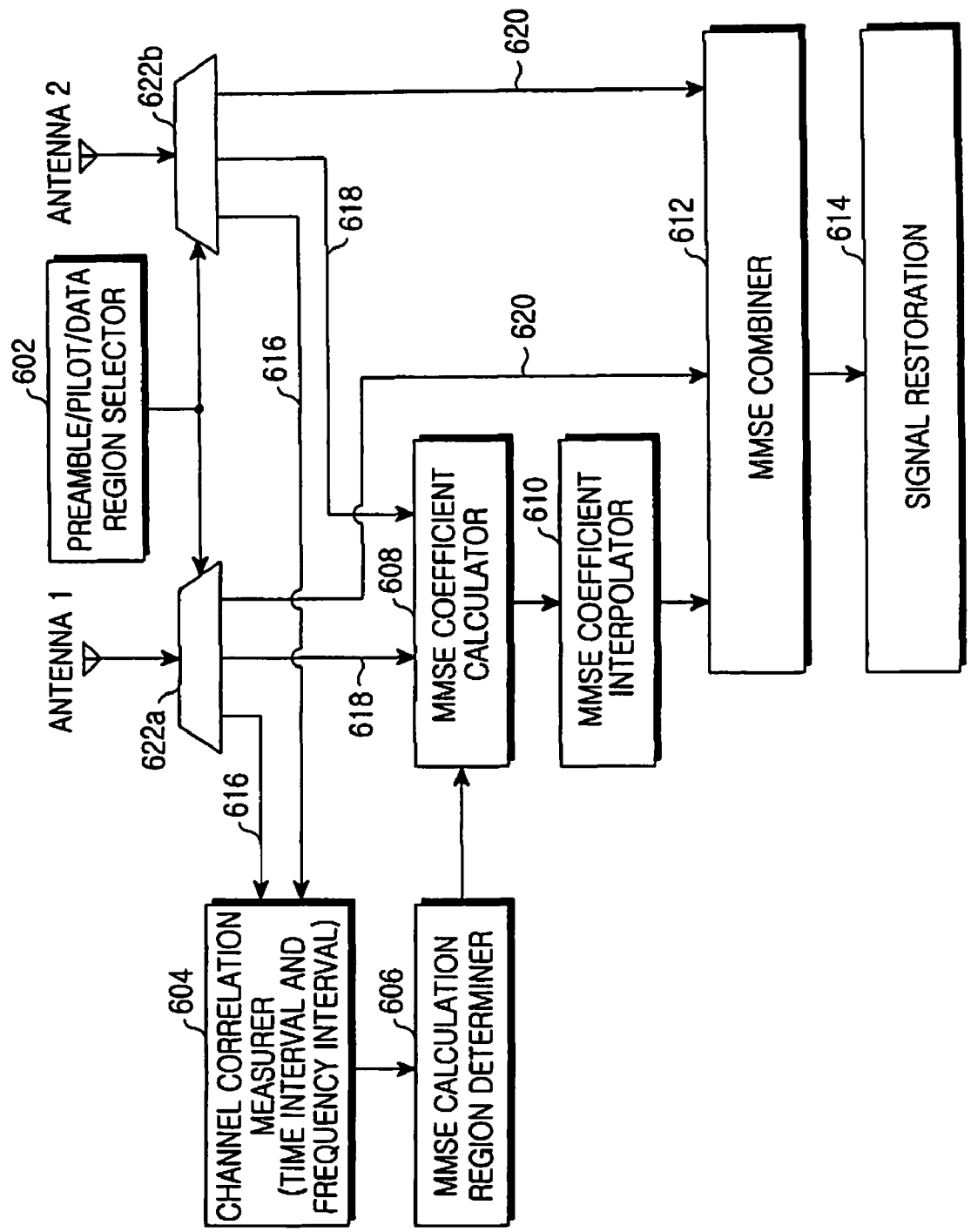
FIG. 6 illustrates a structure of a receiver for measuring an inter-channel correlation characteristic based on preamble signals according to an embodiment of the present invention.

FIG. 6 illustrates a structure of a receiver for measuring an inter-channel correlation characteristic based on preamble signals according to an embodiment of the present invention. The structure shown herein is for the case where 2 receive antennas are used in the MIMO system. The elements 604, 606, 608 and 610 shown in FIG. 6 correspond to the MMSE coefficient detection controller 232 shown in FIG. 2.

Referring to FIG. 6, OFDM(A) signals received via receive antennas #1 and #2 are separated into a preamble signal 616, a pilot signal 618 and a data signal 620 by demultiplexers 622a and 622b under the control of a preamble/pilot/data region selector 602. A channel correlation measurer 604 measures time-domain and frequency-domain channel correlations using the preamble signal 616, and an MMSE calculation region determiner 606 determines MMSE calculation regions using the time-domain and frequency-domain channel correlations. A MMSE coefficient calculator 608 calculates an MMSE coefficient for each of the MMSE calculation regions using the pilot signal 618, and an MMSE coefficient interpolator 610 calculates MMSE coefficients for a data interval by performing time-domain and frequency-domain interpolation using the MMSE coefficients. The MMSE coefficients for the data interval are used for restoring the transmission signal by combining the data signal 620 received via the receive antennas #1 and #2 in an MMSE combiner 612. The transmission signal restored through the MMSE combining undergoes channel demodulation and decoding by a signal restoration unit 614.

Figure 7:
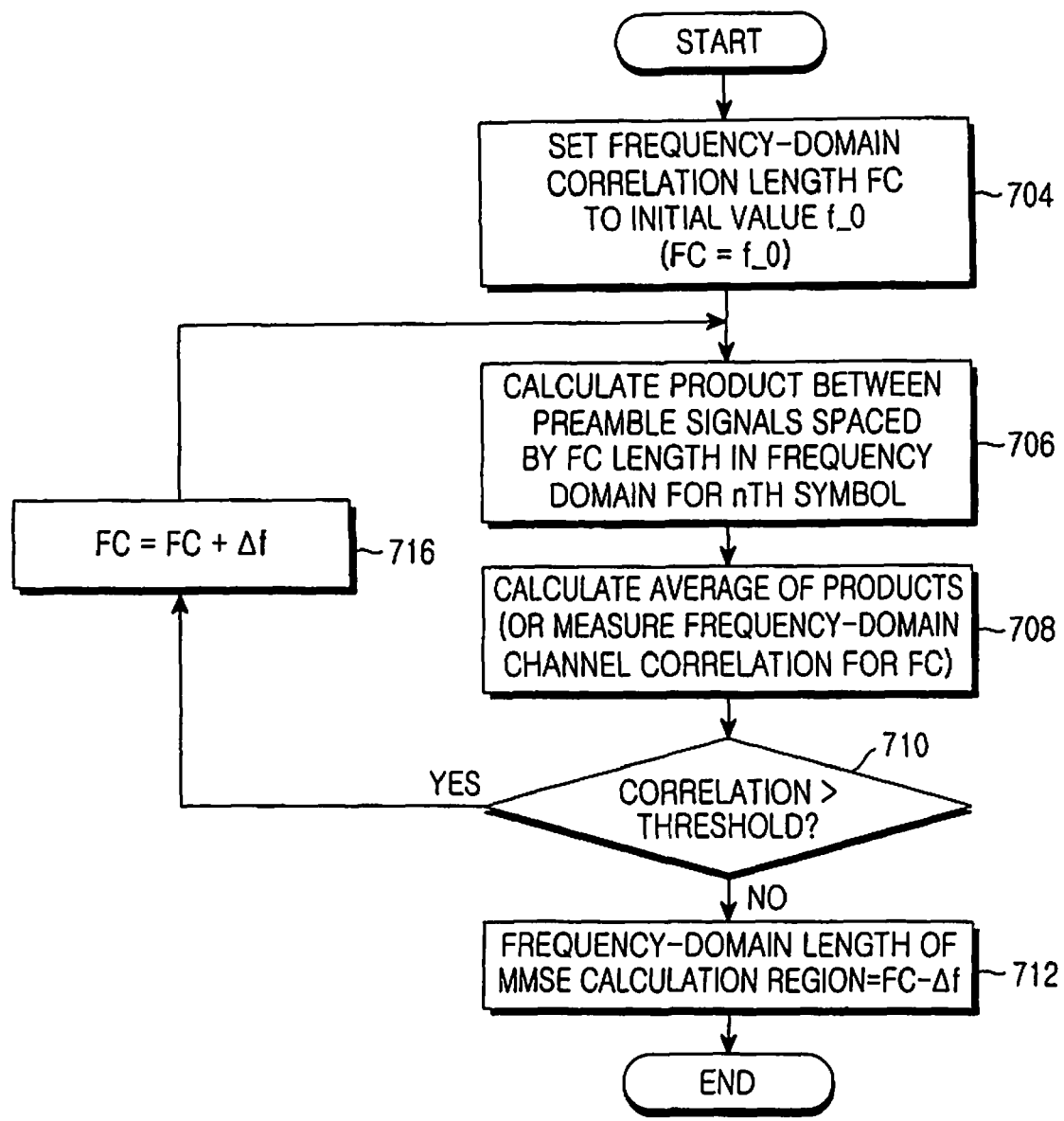
FIG. 7 illustrates an operation of determining a frequency-domain length of an MMSE calculation region according to an embodiment of the present invention.

FIG. 7 illustrates an operation of determining a frequency-domain length of an MMSE calculation region according to an embodiment of the present invention.

Referring to FIG. 7, to measure a frequency-domain channel correlation for an $i^{th}$ received frame, a receiver sets a Frequency Correlation (FC) parameter to be used for calculating a frequency-domain length of an MMSE calculation region to an initial value f_0 in step 704. In step 706, the receiver calculates a product of preamble signals of subcarriers, reduced by FC for an $n^{th}$ symbol in an $i^{th}$ frame. In calculating a product of two preamble signals, the receiver takes a conjugate complex number for a high-subcarrier preamble signal and then multiplies it by a low-subcarrier preamble signal. In step 708, the receiver finds an average of products for all subcarriers, reduced by FC, and calculates it as a frequency-domain channel correlation value. In step 710, the receiver compares the calculated correlation value with a predetermined threshold. If the calculated correlation value is greater than the threshold, the receiver proceeds to step 716 where it increases FC by $\Delta f$, and then returns to step 706. However, if the correlation value is not greater than the threshold, the receiver proceeds to step 712 where it determines the FC reduced by $\Delta_f (= FC - \Delta_f)$ as a frequency-domain length of the MMSE calculation region. Here, a value of $\Delta f$ can be set by experimentation.

Figure 8:
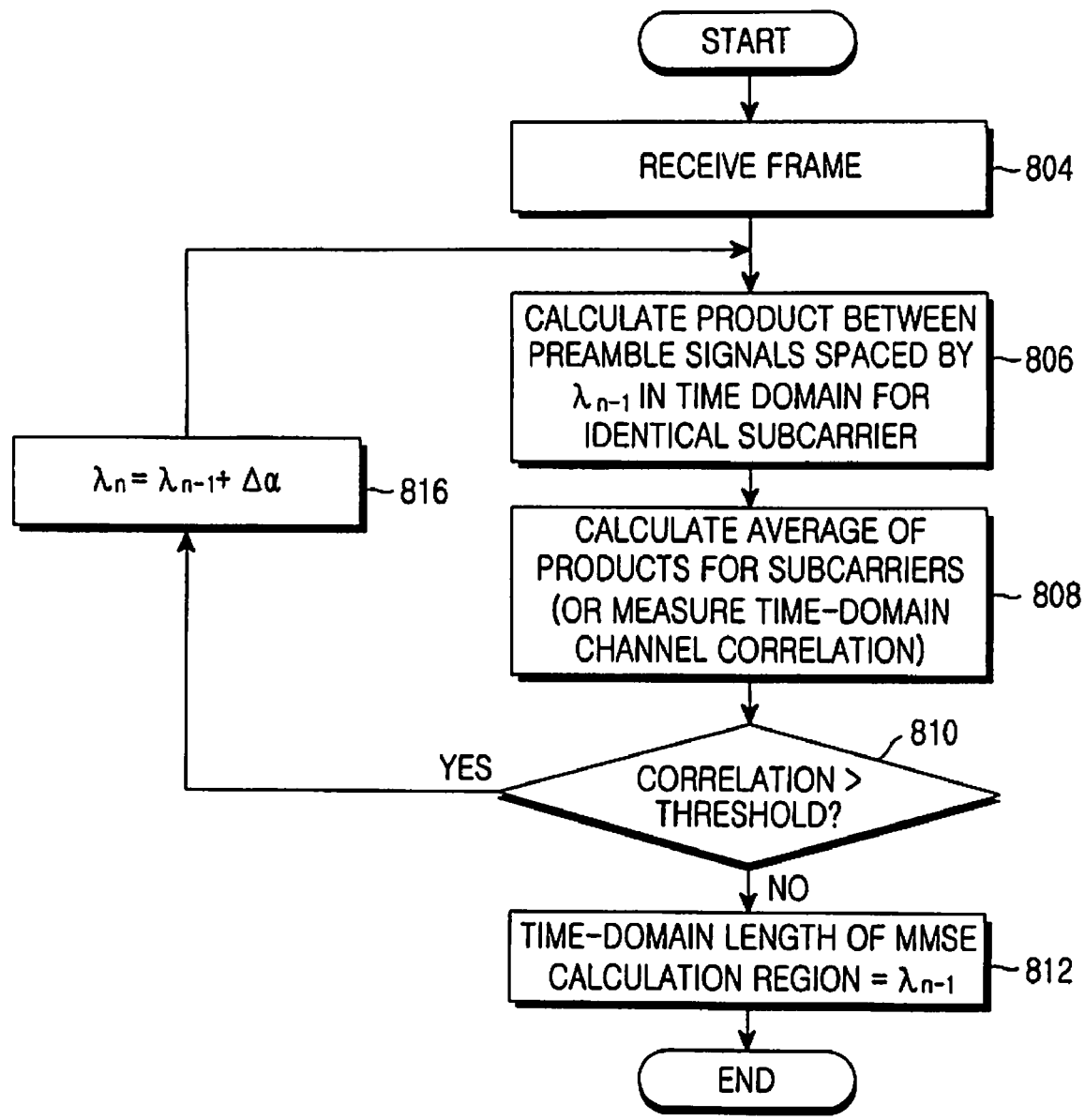
FIG. 8 illustrates an operation of determining a time-domain length of an MMSE calculation region according to an embodiment of the present invention.

FIG. 8 illustrates an operation of determining a time-domain length of an MMSE calculation region according to an embodiment of the present invention. As illustrated, a receiver measures a channel correlation between a preamble extracted from a previous frame and a preamble extracted from the currently received frame. Here, $\lambda_0$ is 0.

Referring to FIG. 8, in step 804, a receiver receives the current frame and stores a preamble signal extracted from the frame. In step 806, the receiver calculate a product of preamble signals spaced apart from each other by $\lambda_{n-1}$ in each subcarrier in the previous frame and the current frame. In calculating a product of two preamble signals, the receiver takes a conjugate complex number for a preamble signal of the previous frame and then multiplies it by a preamble signal of the current frame. In step 808, an average of the products for all subcarriers is calculated as a time-domain channel correlation value.

In step 810, the receiver compares the calculated correlation value with a threshold. If the calculated correlation value is greater than the threshold, the receiver proceeds to step 816 where it increases a time-domain correlation length $\lambda_{n-1}$ by $\Delta \alpha$, and then returns to step 806 to repeat the same operation. However, if the correlation value is not greater than the threshold, the receiver proceeds to step 812 where it determines a time-domain length of the MMSE calculation region as $\lambda_{n-1}$. Here, a value of $\Delta \alpha$ can be set by experimentation.

Figure 9:
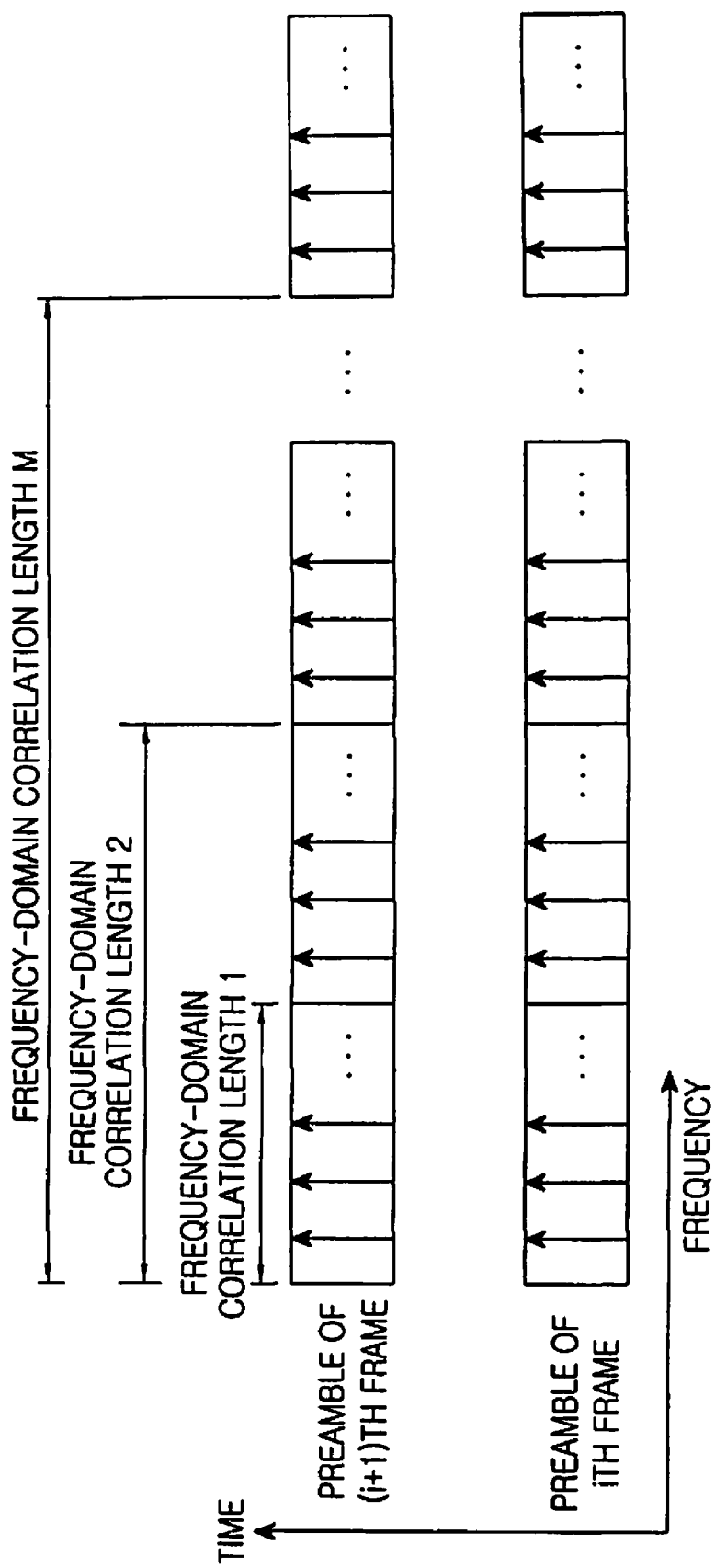
FIG. 9 illustrates a method of determining a time-domain/frequency-domain length of an MMSE calculation region according to another embodiment of the present invention.

FIG. 9 illustrates a method of determining a time-domain/frequency-domain length of an MMSE calculation region according to another embodiment of the present invention. As to one frame composed of OFDM(A) symbols before being transmitted, the horizontal domain is divided into subcarriers and the vertical domain is divided into OFDM(A) symbols. For frequency-domain correlation measurement, the receiver calculates a channel correlation value for each of M different frequency-domain correlation lengths, and selects the maximum frequency-domain correlation length where the channel correlation value exceeds a threshold, as a frequency-domain length of the MMSE calculation region.

For time-domain correlation measurement, the receiver calculates a channel correlation value between an $i^{th}$ frame and an $(i+1)^{th}$ frame, and determines a time-domain correlation length of the MMSE calculation region depending on whether the channel correlation value exceeds the threshold. The calculation of the time-domain channel correlation is performed on the same subcarrier. Although the frames are used in FIG. 9 as a unit for the correlation calculation in the time domain, by way of example, symbols including a pilot and a preamble located in a predetermined subcarrier can also be used as a unit for the correlation calculation in the time domain.

FIG. 10 illustrates an example of setting a size of an MMSE calculation region according to another embodiment of the present invention. The example illustrated herein sets a size of an MMSE calculation region using M frequency-domain correlation lengths and 2 time-domain correlation lengths.

Referring to FIG. 10, a time-domain length of an MMSE calculation region is set to 4 OFDM symbols or 8 OFDM symbols according to whether a time-domain channel correlation for preamble signals of the current frame and the previous frame is greater than a time-domain threshold of 0.6. When a frequency-domain channel correlation for 42 subcarriers exceeds a frequency-domain threshold of 0.9, a frequency-domain length of the MMSE calculation region is 42 subcarriers. Otherwise, the frequency-domain length of the MMSE calculation region is 21 subcarriers. For example, when the mobile station is almost stationary (or moves at a velocity below a threshold), the time-domain length of the MMSE calculation region is 8 OFDM symbols. When the mobile station is on the move, the time-domain length of the MMSE calculation region is 4 OFDM symbols. In addition, when the number of multi-path channels established between the transmitter and the receiver is less than a threshold, 42 subcarriers are set as a frequency-domain length of the MMSE calculation region. However, when the number of multi-path channels established between the transmitter and the receiver is greater than the threshold, the frequency-domain channel correlation decreases, so 21 subcarriers are set as a frequency-domain length of the MMSE calculation region.

Figure 11:
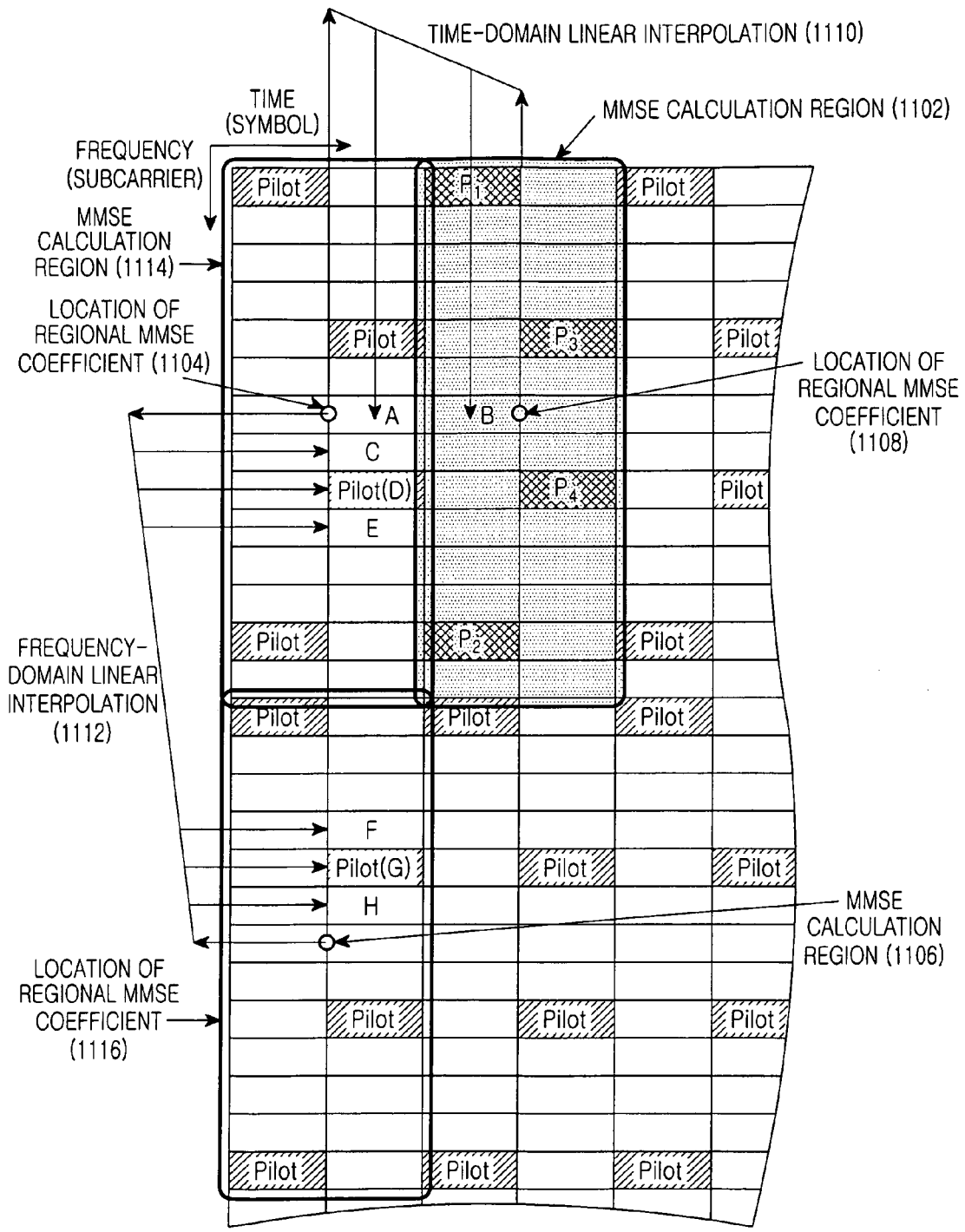
FIG. 11 illustrates an exemplary method of performing linear interpolation on MMSE coefficients in the time domain and the frequency domain according to a preferred embodiment of the present invention.

FIG. 11 illustrates an exemplary method of performing linear interpolation on MMSE coefficients in the time domain and the frequency domain according to a preferred embodiment of the present invention. As illustrated, MMSE coefficients in data locations are obtained by performing linear interpolation on MMSE coefficients obtained in each calculation region in the time domain and the frequency domain. Herein, the frequency domain is shown in subcarriers and the time domain is shown in symbols.

Referring to FIG. 11, calculation regions 1102, 1114 and 1116, as described above, will be set according to the frequency-domain/time-domain channel correlation, and it is considered that MMSE coefficients (reference MMSE coefficients) obtained in the calculation regions 1102, 1114 and 1116 correspond to the central locations 1108, 1104 and 1106 of the corresponding calculation regions 1102, 1114 and 1116. The MMSE coefficients for data locations A and B between the central locations 1108 and 1104 are obtained through time-domain linear interpolation 1110 on the reference MMSE coefficients obtained in the MMSE calculation regions 1102 and 1114. In addition, the MMSE coefficients for data locations A, C, E, F and H, and pilot locations D and G between the central locations 1104 and 1106 are obtained through frequency-domain linear interpolation 1112 on the reference MMSE coefficients obtained in the MMSE calculation regions 1114 and 1116.

The MMSE coefficients in each data location, obtained in this manner, are used for MMSE-combining the data signals received via multiple receive antennas. The combined signal is restored to data information bits through a restoration process by means of a channel decoder.

As is apparent from the foregoing description, in the OFDM(A)-MIMO mobile communication system, the MMSE reception method proposed by the present invention combines signals received via multiple receive antennas taking into account the correlation characteristic between the antennas, thereby obtaining superior reception performance compared to the conventional MRC reception method. In addition, the present invention determines a size of the MMSE calculation region, or a unit of MMSE calculation, according to the frequency-domain/time-domain channel correlation, making it possible to adaptively perform the optimal MMSE calculation depending on the channel conditions. The present invention adaptively calculates MMSE coefficients according to the channel conditions and applies the MMSE coefficients to the signals received via multiple receive antennas, thereby facilitating efficient cancellation of inter-signal interference and improving data decoding performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for receiving a signal in an Orthogonal Frequency Division Multiplexing (OFDM) mobile communication system using multiple receive antennas, the method comprising:

dividing a signal received via multiple receive antennas into a plurality of calculation regions each having a frequency-domain channel correlation exceeding a predetermined threshold and a time-domain channel correlation exceeding a predetermined threshold;

separately calculating Minimum Mean-Squared Error (MMSE) coefficients for the calculation regions using pilot signals in the calculation regions; and restoring a transmission signal by performing MMSE detection on the plurality of calculation regions of the received signal using the MMSE coefficients, wherein each of the calculation regions are composed of a plurality of consecutive OFDM symbols and a plurality of consecutive subcarriers.

2. The method of claim 1, wherein the dividing step comprises:

calculating a frequency-domain channel correlation from a preamble signal detected from a current frame in the received signal, and determining a frequency-domain length of each calculation region according to the frequency-domain channel correlation;

calculating a time-domain channel correlation from preamble signals detected from the current frame and a previous frame in the received signal, and determining a time-domain length of each calculation region according to the time-domain channel correlation; and determining each calculation region having the determined frequency-domain and time-domain lengths.

3. The method of claim 2, wherein the determining a frequency-domain length comprises:

calculating a channel correlation value between preamble signals spaced apart by a frequency-domain correlation length in a frequency domain for a particular symbol in the current frame while increasing the frequency-domain correlation length in units of a predetermined frequency; and if the calculated channel correlation value exceeds a predetermined threshold, determining, as the frequency-domain length of the calculation region, a frequency-domain correlation length given before the channel correlation value exceeds the threshold.

4. The method of claim 2, wherein the determining a frequency-domain length comprises:

calculating channel correlation values for a plurality of frequency-domain correlation lengths predetermined in a particular symbol of the current frame; and determining, as the frequency-domain length of the calculation region, a maximum frequency-domain correlation length having a channel correlation value exceeding a predetermined threshold among the plurality of frequency-domain correlation lengths.

5. The method of claim 2, wherein the determining a time-domain length comprises:

calculating a channel correlation value between preamble signals which are located in a same subcarrier in the received signal and spaced apart by a time-domain correlation length, while increasing the time-domain correlation length in units of a predetermined time; and if the calculated channel correlation value exceeds a predetermined threshold, determining, as the time-domain length of the calculation region, a time-domain correlation length given before the channel correlation value exceeds the threshold.

6. The method of claim 2, wherein the determining a time-domain length comprises:
calculating a channel correlation value for two consecutive frames in the received signal;
if the calculated channel correlation value exceeds a predetermined threshold, determining, as the time-domain length of the calculation region, a greater of two predetermined time-domain correlation lengths; and
if the calculated channel correlation value does not exceed the threshold, determining, as the time-domain length of the calculation region, a lesser of the time-domain correlation lengths.

7. The method of claim 1, further comprising:
interpolating the calculated MMSE coefficients with respect to a time domain and a frequency domain to determine MMSE coefficients for data regions of the received signal, to be used for restoring the transmission signal.

8. The method of claim 7, wherein the interpolating step comprises:
setting the MMSE coefficients calculated for the calculation regions as reference MMSE coefficients for locations predetermined in the calculation regions; and
calculating MMSE coefficients for remaining locations in the calculation regions through time-domain interpolation and frequency-domain interpolation on the reference MMSE coefficients.

9. An apparatus for receiving a signal in an Orthogonal Frequency Division Multiplexing (OFDM) mobile communication system using multiple receive antennas, the apparatus comprising:
a controller for dividing a signal received via multiple receive antennas into a plurality of calculation regions each having a frequency-domain channel correlation exceeding a predetermined threshold and a time-domain channel correlation exceeding a predetermined threshold, and separately calculating Minimum Mean-Squared Error (MMSE) coefficients for the calculation regions using pilot signals in the calculation regions; and
an MMSE detector for restoring a transmission signal by performing MMSE detection on the plurality of calculation regions of the received signal using the MMSE coefficients,
wherein each of the calculation regions are composed of a plurality of consecutive OFDM symbols and a plurality of consecutive subcarriers.

10. The apparatus of claim 9, wherein the controller:
calculates a frequency-domain channel correlation from a preamble signal detected from a current frame in the received signal, and determines a frequency-domain length of each calculation region according to the frequency-domain channel correlation;
calculates a time-domain channel correlation from preamble signals detected from the current frame and a previous frame in the received signal, and determines a time-domain length of each calculation region according to the time-domain channel correlation; and
determines each calculation region having the determined frequency-domain and time-domain lengths.

11. The apparatus of claim 10, wherein the controller:
calculates a channel correlation value between preamble signals spaced apart by a frequency-domain correlation length in a frequency domain for a particular symbol in the current frame while increasing the frequency-domain correlation length in units of a predetermined frequency; and
if the calculated channel correlation value exceeds a predetermined threshold, determines, as the frequency-domain length of the calculation region, a frequency-domain correlation length given before the channel correlation value exceeds the threshold.

12. The apparatus of claim 10, wherein the controller:
calculates channel correlation values for a plurality of frequency-domain correlation lengths predetermined in a particular symbol of the current frame; and
determines, as the frequency-domain length of the calculation region, a maximum frequency-domain correlation length having a channel correlation value exceeding a predetermined threshold among the plurality of frequency-domain correlation lengths.

13. The apparatus of claim 10, wherein the controller:
calculates a channel correlation value between preamble signals which are located in a same subcarrier in the received signal and spaced apart by a time-domain correlation length, while increasing the time-domain correlation length in units of a predetermined time; and
if the calculated channel correlation value exceeds a predetermined threshold, determines, as the time-domain length of the calculation region, a time-domain correlation length given before the channel correlation value exceeds the threshold.

14. The apparatus of claim 10, wherein the controller:
calculates a channel correlation value for two consecutive frames in the received signal;
if the calculated channel correlation value exceeds a predetermined threshold, determines, as the time-domain length of the calculation region, a greater of two predetermined time-domain correlation lengths; and
if the calculated channel correlation value does not exceed the threshold, determines, as the time-domain length of the calculation region, a lesser of the time-domain correlation lengths.

15. The apparatus of claim 9, wherein the controller comprises:
an interpolator for interpolating the calculated MMSE coefficients with respect to a time domain and a frequency domain to determine MMSE coefficients for data regions of the received signal, to be used for restoring the transmission signal.

16. The apparatus of claim 15, wherein the interpolator:
sets the MMSE coefficients calculated for the calculation regions as reference MMSE coefficients for locations predetermined in the calculation regions; and
calculates MMSE coefficients for remaining locations in the calculation regions through time-domain interpolation and frequency-domain interpolation on the reference MMSE coefficients.

* * * * *